(12) United States Patent
Schomacker et al.

(10) Patent No.: US 9,713,969 B2
(45) Date of Patent: Jul. 25, 2017

(54) PASSENGER SEAT AND PASSENGER SEATING SYSTEM HAVING A FLEXIBLE SEATING ARRANGEMENT FOR MEANS OF PASSENGER TRANSPORT

(71) Applicant: Airbus Operations GmbH, Hamburg (DE)

(72) Inventors: Lars Schomacker, Hagenah (DE); Frank Quatmann, Seevetal (DE)

(73) Assignee: Airbus Operations GmbH, Hamburg (DE)

( * ) Notice: Subject to any disclaimer, the term of this patent is extended or adjusted under 35 U.S.C. 154(b) by 400 days.

(21) Appl. No.: 14/249,573

(22) Filed: Apr. 10, 2014

(65) Prior Publication Data
US 2014/0306061 A1 Oct. 16, 2014

(30) Foreign Application Priority Data
Apr. 11, 2013 (DE) .................. 10 2013 103 667

(51) Int. Cl.
*B64D 11/06* (2006.01)
*B60N 2/30* (2006.01)
*B60N 2/01* (2006.01)

(52) U.S. Cl.
CPC ............ *B60N 2/3065* (2013.01); *B60N 2/01* (2013.01); *B64D 11/06* (2013.01);
(Continued)

(58) Field of Classification Search
CPC .. B60N 2/302; B60N 2/3022; B64D 11/0601; B64D 11/0639; B64D 11/064; B64D 11/0696
See application file for complete search history.

(56) References Cited

U.S. PATENT DOCUMENTS 6,688,554 B2 2/2004 Weekly
7,083,146 B2 * 8/2006 Hiesener ............... B64D 11/00
244/118.5
(Continued)

FOREIGN PATENT DOCUMENTS

DE 102007063565 A1 6/2009
DE 102009004987 A1 7/2010
DE 102010004798 A1 7/2011

OTHER PUBLICATIONS

German Patent Office, German Search Report dated Oct. 11, 2014 for German Patent Application No. 102012006194.3.
(Continued)

*Primary Examiner* — Philip Gabler
(74) *Attorney, Agent, or Firm* — Lorenz & Kopf, LLP (57) ABSTRACT

A folding passenger seat and a corresponding passenger seating system for means of passenger transport are provided. The folding passenger seat comprises a seat frame, on which a front seat leg having a first fastening element and a rear seat leg having a second fastening element are arranged. The first fastening element and the second fastening element are configured to be connected to rails on a cabin floor of the means of passenger transport and to be displaced in the rails. A first joint element is arranged between the first fastening element and the second fastening element such that a spacing between the first fastening element and the second fastening element is variable. In particular, the first joint element may be arranged between the front seat leg and the seat frame or between the rear seat leg and the seat frame.

8 Claims, 3 Drawing Sheets

(52) U.S. Cl.
CPC ...... *B64D 11/0601* (2014.12); *B64D 11/0648* (2014.12); *B64D 11/0696* (2013.01); *Y10T 29/49826* (2015.01)

(56) References Cited

U.S. PATENT DOCUMENTS

| | | | |
|---|---|---|---|
| 2005/0248193 A1* | 11/2005 | Dowty | B64D 11/06 297/248 |
| 2008/0265644 A1* | 10/2008 | Delleman | B60N 2/3018 297/356 |
| 2010/0308619 A1* | 12/2010 | Hoge | B60N 2/12 296/65.08 |
| 2011/0017869 A1 | 1/2011 | Gonnsen et al. | |
| 2011/0062285 A1 | 3/2011 | Herzog et al. | |
| 2013/0234486 A1 | 9/2013 | Duus et al. | |

OTHER PUBLICATIONS

German Patent and Trade Mark Office, German Search Report for German Patent Application No. 102013103667.8, mailed Feb. 19, 2014.

\* cited by examiner

PASSENGER SEAT AND PASSENGER SEATING SYSTEM HAVING A FLEXIBLE SEATING ARRANGEMENT FOR MEANS OF PASSENGER TRANSPORT

CROSS-REFERENCE TO RELATED APPLICATION

This application claims priority to German Patent Application No. 10 2013 103 667.8 filed Apr. 11, 2013, which is incorporated herein by reference in its entirety.

TECHNICAL FIELD

The technical field relates to a folding passenger seat in a means of passenger transport, to a corresponding passenger seating system for means of passenger transport, to an aircraft having a passenger seating system and to a corresponding method for manufacturing a folding passenger seat.

BACKGROUND

The number and distribution of seats in the cabin of a means of passenger transport, for example an aircraft, can represent an important economic factor. Reconfiguring previously installed seats may require considerable time and effort. It may be difficult, especially in aircraft, to adapt the distribution of the seats in the cabin to the number and category of places actually reserved.

DE 10 2008 006 947 A1, US 2011 017 869 A1, DE 10 2008 006 948 A1 and US 2011 062 285 A1, for example, disclose systems for simultaneously longitudinally displacing a plurality of seats or rows of seats in an aircraft. Further, DE 10 2010 046 853 A1 and WO 2012 041 465 A1, for example, disclose a seat having sections of the seat surface which can take on different operational positions to increase the seat comfort.

In addition, other objects, desirable features and characteristics will become apparent from the subsequent summary and detailed description, and the appended claims, taken in conjunction with the accompanying drawings and this background.

SUMMARY

Accordingly, there may be a need to provide an option for increasing the flexibility of the seating arrangement in a means of passenger transport with minimal outlay in terms of time and cost.

According to one of various aspects of the present disclosure, a folding passenger seat is provided for a means of passenger transport. The passenger seat comprises a seat frame, a front seat leg having a first fastening element, and a rear seat leg having a second fastening element. The first fastening element and the second fastening element are configured to be connected to rails on the means of passenger transport and to be moved or displaced in the rails. In this context, a first joint element is arranged between the front seat leg and the seat frame and/or between the rear seat leg and the seat frame in such a way that a spacing between the first fastening element and the second fastening element is variable.

In other words, the notion behind the present disclosure is based on providing a first joint element on or between the seat legs of the folding passenger seat in such a way that the passenger seat can be telescoped, for example so that it becomes shorter in the direction of travel of the means of transport and longer in the vertical extension thereof. By contrast with conventional seats, which have a fixed spacing between the seat legs, the spacing between the lower ends of the seat legs is variable.

Providing the first joint element between the first and the second fastening element on the seat legs permits greater flexibility of the passenger seating arrangement possible in the cabin of the means of passenger transport. In particular, the flexibility of the seating arrangement can be increased as regards the seat spacing. In this context, unused folding passenger seats can be stowed in a smaller space than conventional seats. Furthermore, the simple construction of the folding passenger seats permits a more rapid reconfiguration of the seating arrangement or of the spacing between the passenger seats than would be possible with conventional seats.

The folding or collapsible or telescopable passenger seat is configured for use in means of passenger transport for example comprising a plurality of rows of passenger seats. In this context, means of passenger transport may include for example trains, buses or airborne vehicles, in one example, aircraft.

The passenger seat comprises a seat frame. A seat shell, which may also be referred to as a seat pan, may be provided on the seat frame. In this context, the seat frame may for example comprise plastics materials and metal. The seat shell, to which for example a seat cushion may be fastened, may comprise plastics materials. A front seat leg and a rear seat leg may be provided on the underside of the seat frame. In this context, the front seat leg may be arranged in a front region of the seat frame in the direction of travel of the means of passenger transport or in the seating direction of the passenger. Correspondingly, the rear seat leg may be arranged in a rear region of the seat frame.

In this context, the passenger seat may be configured as part of a row of seats. The row of seats may for example comprise two or three passenger seats. In one example, the passenger seats of a row of seats may comprise shared front and/or rear seat legs and a shared seat frame.

A first fastening element is provided in a lower region of the front seat leg. A second fastening element is further provided in the lower region of the rear seat leg.

The fastening elements are configured to be connected to rails on the means of passenger transport. This may for example take place using what are known as fittings. In one example, the fastening elements may be configured to be connected to fittings or to studs of a fitting. The fastening elements may further be moved or displaced in the rails. In this way, the spacing between the first and the second fastening element can be varied. Alternatively, for example, one of the fastening elements may be released from the fittings or from the rails before the fastening elements are moved towards one another. In this context, the rails may for example be arranged on the cabin floor, on a side wall of the cabin and/or on a cabin ceiling of the means of passenger transport.

The first joint element, which is arranged between the front seat leg and the seat frame, may be configured as a movable connector between the two components. The first joint element may in one example be configured as a swivel joint or as a hinge. In this context, the first joint element acts as a point of rotation or axis of rotation for swivelling the front seat leg. Alternatively, the first joint element may be arranged between the rear seat leg and the seat shell and as a point of rotation for swiveling the rear seat leg. In addition, a first joint element may be arranged between the seat legs and the seat frame in each case.

A first joint element may in one example be provided between the first fastening element and the second fastening element on one of the seat legs. In this context, the first joint element may be arranged directly between the seat frame and one of the seat legs. Alternatively, the first joint element may be arranged indirectly between one of the seat legs and the seat frame. In other words, the first joint element may for example be arranged between the first and the second seat leg.

In this context, the first joint element is arranged between the seat legs and the seat frame such that the spacing between the first fastening element and the second fastening element is variable. In other words, the seat legs can be swiveled about the first joint such that the spacing between the first fastening element and the second fastening element is either increased or reduced. This spacing may for example be measured parallel to the cabin floor between the geometric midpoints of the fastening elements.

Currently, a maximum distance between the fastening elements may for example be approximately 18" or about 19". This corresponds to about 45.72 cm or about 48.26 cm. In this case, the front and the rear seat leg are folded out to the maximum extent, so that the minimum seat spacing when storing the passenger seats is for example approximately 21" or about 53.34 cm. Collapsing the seat legs via the first joint element, for example, makes it possible to obtain a minimum spacing between the fastening elements of between about 12" and about 14" or between about 30.48 cm and about 35.65 cm if the fastening elements are not released from the rails on the cabin floor. In this case, the minimum seat spacing can be reduced to approximately 15" or about 16" or to about 38.10 cm or about 40.64 cm. If one of the fastening elements is released from the rails on the cabin floor, the spacing between the fastening elements can even be reduced to zero. In this case, a minimum seat spacing of approximately 10" or about 11" or about 25.40 cm or about 27.94 cm can be achieved.

According to one embodiment of the present disclosure, the folding passenger seat is configured to adopt a stored state and a usable state. The spacing between the first fastening element and the second fastening element is smaller in the stored state than in the usable state. In the usable state, the spacing between the fastening elements may for example be about 18" or about 19". In the stored state, the spacing between the fastening elements may be between about 0" and about 14".

According to one embodiment of the present disclosure, the passenger seat also comprises a backrest. In this context, the backrest is connected to the seat frame via a second joint element such that the backrest is positioned above the first fastening element and/or above the second fastening element in the stored state. In other words, the backrest may for example be swiveled backwards with respect to the direction of travel of the means of passenger transport or with respect to the seating direction such that a geometric midpoint of the backrest is positioned substantially vertically above the fastening elements in the stored state of the passenger seat. In one example, the backrest may run substantially along a mid-perpendicular line between the fastening elements. In this context, for example, "substantially" may mean a maximum deviation of about 20 cm, for example of about 10 cm and as another example of about 5 cm, from the vertical above one of the fastening elements.

Similarly to the first joint element, the second joint element may be configured as a hinged point of rotation or hinged axis of rotation. For example, the second joint element may make it possible to tilt the backrest backwards through an angle of between about 20° and about 40°, in one example of about 33°.

In this context, the backrest may for example be brought manually into the position above the fastening element. Alternatively, the backrest may be tilted automatically, for example via a mechanical lever mechanism, when the fastening elements are telescoped into the position above the fastening elements. In this way, the space requirement of the passenger seat in the stored state can be reduced.

According to one embodiment of the present disclosure, the folding passenger seat is configured to adopt a seat spacing in the stored state of a maximum of about 16" or about 40.64 cm, in one example, a maximum of about 11" or about 27.94 cm, from an adjacent front seat and/or from an adjacent rear seat. In this context, the seat spacing may for example be the spacing between the rear fastening element of a first passenger seat and the rear fastening element of a second passenger seat arranged on a rail system behind the first passenger seat. By contrast, in the usable state the seat spacing may for example be between about 25" and about 40", in one example between about 32" and about 37".

According to one embodiment of the present disclosure, the folding passenger seat also comprises a seat cushion. In this context, the seat cushion may be arranged on the seat frame, in one example on a seat shell provided on the seat frame. In this context, the seat cushion is connected to the seat frame or to the seat shell via a third joint element such that the seat cushion is positioned above the first fastening element and/or above the second fastening element in the stored state. In other words, the seat cushion can adopt an approximately vertical position along a mid-perpendicular line between the fastening elements and thus reduce the space required by the passenger seat in the stored state. In addition, the seat cushion may be configured to be foldable.

According to one embodiment of the present disclosure, the seat cushion is fixed to the seat frame or to the seat shell in a removable manner. In other words, the seat cushion may be fixed to the seat frame or to the seat shell such that it can be removed from the seat frame or from the seat shell in a simple manner without major effort. For example, a snap-in or latch connection for the seat cushion may be provided on the seat frame or on the seat shell. Alternatively or in addition, corresponding hook-and-loop fastener elements may be provided on the seat shell or on the seat frame and on the seat cushion. By removing the seat cushion, the space required by the passenger seat in the stored state can be reduced.

According to one embodiment of the present disclosure, the folding passenger seat also comprises an armrest. The armrest is arranged on the backrest. In this context, the armrest is connected to the backrest via a fourth joint element such that the armrest is positioned above the first fastening element and/or above the second fastening element in the stored state. Alternatively, the armrest may be connected to the seat frame via the fourth joint element. Similarly to the backrest and to the seat cushion, the armrest can be swiveled around the fourth joint element in the stored state such that the geometric mid-point of the armrest is positioned in a region of a mid-perpendicular line between the first fastening element and the second fastening element. In this context, the armrest may be swiveled for example upwards or downwards, i.e. counter clockwise or clockwise.

One of various aspects of the present disclosure describes a passenger seating system having a flexible seating arrangement for a means of passenger transport. The passenger seating system comprises a first folding passenger seat as described above and a second folding passenger seat as described above. In this context, the second folding passenger seat is arranged behind the first folding passenger seat in a rail system. The second folding passenger seat is configured to adopt a usable state in which the spacing between a rear fastening element of the first passenger seat and a rear fastening element of the second passenger seat is between about 25" and about 40", in one example between about 32" and about 36". The second folding passenger seat is further configured to be folded and slid in the rail system in such a way that in a stored state the spacing between a rear fastening element of the first passenger seat and a rear fastening element of the second passenger seat is between about 10" and about 15".

Configuring the folding passenger seats with joint elements makes it possible to considerably reduce the space requirement of the passenger seat in the stored state by comparison with known seats. Further, because of the simple construction of the folding passenger seats, transforming the folding passenger seat from the usable state into the stored state is very simple and requires only minimum effort. In this context, in aircraft the seating arrangement can for example be adapted to the actual number of seats booked and to the corresponding seating categories in a short time. For example, the adaptation may take place between the passengers leaving the cabin and the new passengers boarding. If for example some rows are unbooked, i.e. are empty, for the current flight, the unused rows of seats can be transformed into the stored state and the seat spacing for the booked rows can increased before the passengers board, making the passengers' journey more comfortable.

According to one embodiment of the present disclosure, the passenger seating system further comprises a third, conventional seat, for which a spacing between a first fastening element and a second fastening element is constant, in other words not variable. In this context, the third conventional seat may be arranged in front of the first folding passenger seat in the seating direction in the rail system. In other words, a combination of folding passenger seats and conventional seats may be provided in the cabin. In this way, only a few folding passenger seats are needed so as to save large amounts of space. Further, merely a slight modification to existing cabin equipment is required.

One of various aspects of the present disclosure describes the use of a folding passenger seat as described above in an aircraft.

One of various aspects of the present disclosure describes an aircraft having a passenger cabin and a cabin floor. In this context, a rail system is provided on the cabin floor. A passenger seating system as described above is also provided on the rail system. Alternatively or in addition, the rail system may be arranged on a cabin ceiling and/or on a cabin side.

One of various aspects of the present disclosure describes a method for manufacturing a folding passenger seat as described above for a means of passenger transport. The method comprises the following: providing a seat frame; arranging a front seat leg having a first fastening element on the seat frame; arranging a rear seat leg having a second fastening element on the seat frame; configuring the first fastening element and the second fastening element such that they can be connected to rails on the means of passenger transport and are movable or displaceable in the rails; arranging a first joint element between the front seat leg and the seat frame and/or between the rear seat leg and the seat frame in such a way that a spacing between the first fastening element and the second fastening element is variable.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In addition, spacings and relationships between sizes are not shown true to scale in the figures. Similar or identical components are given the same reference numerals in the various figures.

In means of passenger transport, for example in aircraft, it may be advantageous to adapt the number and distribution of the seats to the booked seating categories and to the number of booked seats in a flexible manner. With known seats, for example, the seat surface can merely be folded away, just like a cinema seat. In this context, in known seats, the spacing between the seat legs is fixed.

Figure 1:
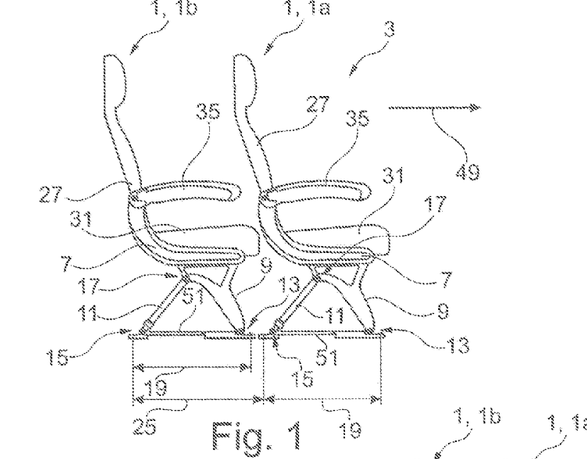
FIG. 1 shows folding passenger seats in the unfolded state in accordance with one embodiment of the present disclosure.
Figure 2:
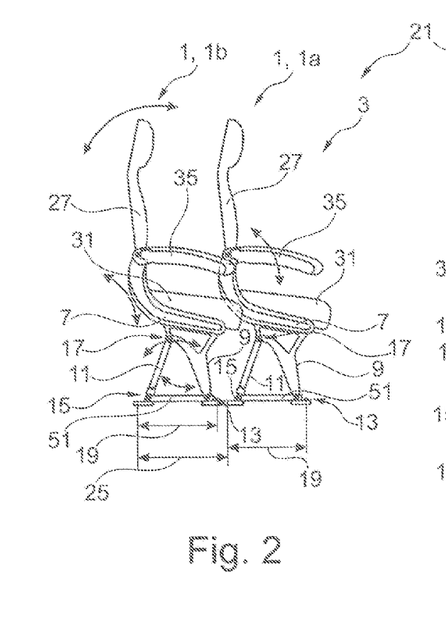
FIG. 2 shows folding passenger seats in the stored state in accordance with one embodiment of the present disclosure.
Figure 3:
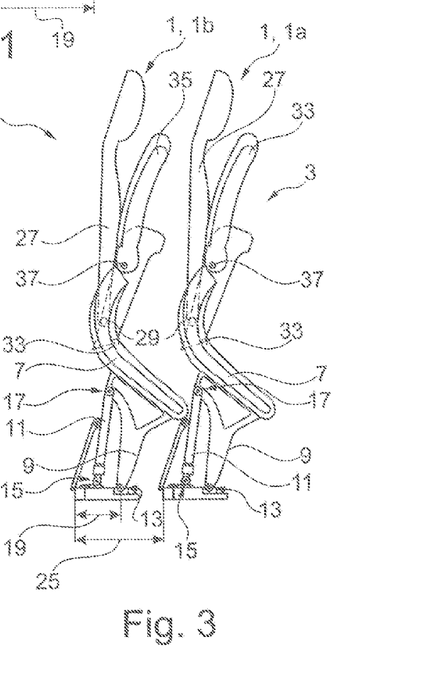
FIG. 3 shows folding passenger seats in the stored state in accordance with one embodiment of the present disclosure.

FIGS. 1 to 3 show folding passenger seats 1 according to the various teachings of the present disclosure. The folding passenger seats 1 make it possible for example to respond in a quick and flexible manner to different flight scenarios, different flight destinations, different passenger numbers and different passenger classes in an aircraft cabin. The folding passenger seats 1 make it possible to reconfigure the seating arrangement, for example during a transition period, in other words between the passengers leaving the cabin and new passengers boarding. Previously, this was only possible during a technical check or during a night stopover on the ground. The folding passenger seats 1 also make it possible to ensure the availability of seating arrangements with a more comfortable seat spacing for the passengers. In this context, the unused folding passenger seats 1 do not have to be removed from the means of passenger transport, as was previously the case, but can be transformed into a stored state therein.

Figure 5:
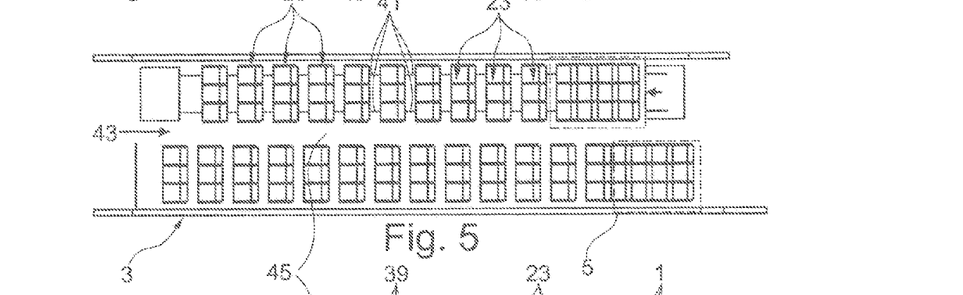
FIG. 5 shows a cabin of a means of passenger transport in which some of the seats are unused and are stowed as in FIG. 1.

For this purpose, as shown in FIGS. 1 to 3, the folding passenger seat 1 comprises a seat frame 7, a front seat leg 9 having a first fastening element 13 and a rear seat leg 11 having a second fastening element 15. In this context, the first fastening element 13 and the second fastening element 15 are configured to be connected to rails 41, as shown in FIG. 5, on a cabin floor 45 of the means of passenger transport 5. The fastening elements 13, 15 are further configured to be displaced on the rails. A first joint element 17, around which the rear seat leg 11 can be swiveled such that a spacing 19 between the first fastening element 13 and the second fastening element 15 is variable, is provided between the rear seat leg 11 and the seat frame 7. Alternatively, the first joint element 17 may be provided between the seat frame 7 and the front seat leg 9. This is not shown in the figures.

The first joint element 17, which provides an axis of rotation, makes it possible to transform the folding passenger seat 1 from a usable state 23 (as shown for example in FIGS. 4 to 7) into a stored state 21 (as shown for example in FIGS. 2 and 3). In the stored state 21, an unused seat can be stowed in a smaller space than a conventional seat. The additional space gained by transforming the folding seat 1 into the stored state 21 can be used to increase a spacing of the used seats in the passenger cabin. For example, in this context economy class seats can be converted into business class seats. Other additional classes such as premium economy or business economy may also be introduced in a cabin of the means of passenger transport, for example. In this way, a different layout of the seating arrangement can be used for each individual flight or each individual journey, depending on the demand and the fraction of seats sold. This would not be possible with conventional seats.

In FIG. 1, a first folding passenger seat 1a and a second folding passenger seat 1b are positioned one behind the other. The second folding passenger seat 1b is positioned behind the first folding passenger seat 1a in the direction of travel 49 of the means of passenger transport or in the seating direction. In this context, the folding passenger seats 1a, 1b are shown in an unfolded state. In this unfolded state, the seats could be used by passengers. However, the seats shown in FIG. 1 are pushed together as closely as possible, as is the case when storing conventional seats. In this case, the spacing 19 between the first fastening element 13 and the second fastening element 15 is approximately 18" or about 19". In this case, the minimum possible seat spacing 25 from an adjacent front or rear seat is approximately 21". In this context, the seat spacing 25 may for example be the spacing between the second fastening element 15 of the first folding passenger seat 1a and the second fastening element 15 of the second folding passenger seat 1b.

FIG. 2 shows the folding passenger seats 1a, 1b in a stored state 21 in accordance with one embodiment of the present disclosure. In this context, the seat legs 9, 11 are left in the rails 41 or in corresponding fittings and are pushed as close together as possible. In this case, the minimum distance 19 between the first fastening element 13 and the second fastening element 15 of each of the passenger seats 1a, 1b is approximately 12" to about 14". This makes possible a minimum seat spacing 25 of between about 15" and about 16".

FIG. 3 shows the folding passenger seats 1a, 1b in a stored state 21 in accordance with one embodiment of the present disclosure. In this context, in each case the rear seat leg 11 of the folding passenger seats 1a, 1b is released from the rails 41 and thus swiveled as closely as possible to the front seat leg 9 via the first joint element 17. As a result, a spacing 19 of between about 0" and about 5" can be achieved between the first fastening element 13 and the second fastening element 15 of the respective folding passenger seats 1a, 1b. In total, in the stored state 21 of the embodiment of FIG. 3 a seat spacing 25 between about 10" and about 11" is made possible. When transforming the folding passenger seat 1 into the stored state 21, the first fastening element 13 may act as a joint or point of rotation in the embodiments shown.

In addition to the variable spacing 19 between the first fastening element 13 and the second fastening element 15, additional components of the folding passenger seat 1 can also be designed to fold or collapse. As is shown in FIGS. 2 and 3, the backrest 27 of the folding passenger seat 1 may be connected to the seat frame 7 such that it can rotate or swivel by means of a second joint element 29. In this context, the backrest 27 may be folded backwards with respect to the seating direction 49 in the stored state such that said backrest is positioned in the region of a mid-perpendicular line between the telescoped fastening elements 13, 15 of the folding passenger seat 1.

In addition, a seat cushion 31 of the folding passenger seat 1 may be connected to the seat frame 7 by means of a third joint element 33. In this context, in the stored state 21, the seat cushion 31 may be swivelled via the third joint element 33, as shown in FIG. 3, such that it is also positioned in the region of a mid-perpendicular line between the first fastening element 13 and the second fastening element 15 of the respective folding passenger seat 1. Alternatively, the seat cushion 31 may be configured to be removable.

Further, as is shown in FIG. 3, an armrest 35 may be connected to the backrest 27 or alternatively to the seat frame 7 by means of a fourth joint element 37. In the stored state 21, the armrests 35 may be swiveled via the fourth joint element 37 such that said armrest is also positioned in the region of a mid-perpendicular line between the first fastening element 13 and the second fastening element 15.

Figure 4:
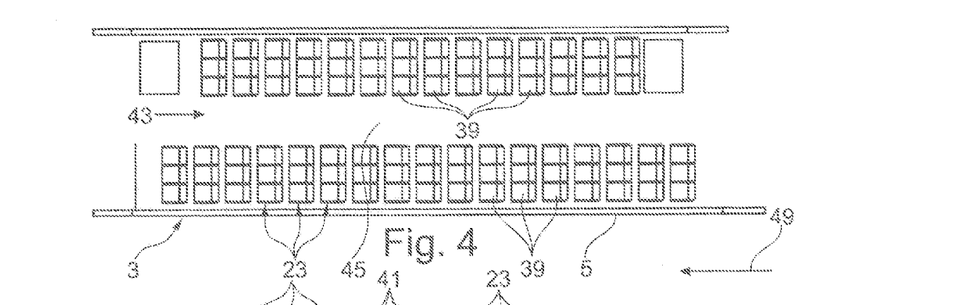
FIG. 4 shows a cabin of a means of passenger transport in which all of the seats are used.

FIGS. 4 to 7 illustrate cabins 43 of a means of passenger transport 5 having different seating arrangements or configurations. In this context, the passenger seats are combined to form a passenger seating system 3. In this context, the passenger seats are also arranged on rails 41 or on a rail system. This is shown by way of example in FIG. 5. FIG. 4 shows a seating arrangement in the cabin of a means of passenger transport 5 in which all of the seats are used or occupied. In this context, the seats may be configured as conventional seats 39 or else as folding passenger seats 1. There are 93 seats available overall. In this configuration, the seat spacing 25 between adjacent seats is about 32".

In the embodiment of FIG. 5, some of the seats, specifically 26% of the seats, are unused, which means that only 69 seats are required for passengers. The unused rows of seats, for example in the rear region of the cabin 43, are pushed together as shown in FIG. 1. As a result, the remaining seats or rows of seats can be arranged with a larger spacing compared with the configuration shown in FIG. 4. In one example, a seat spacing 25 of about 36" can be set for the used seats. The stowing method shown in FIG. 5 can be implemented with conventional seats 39 or with folding passenger seats 1.

Figures 6, 7:
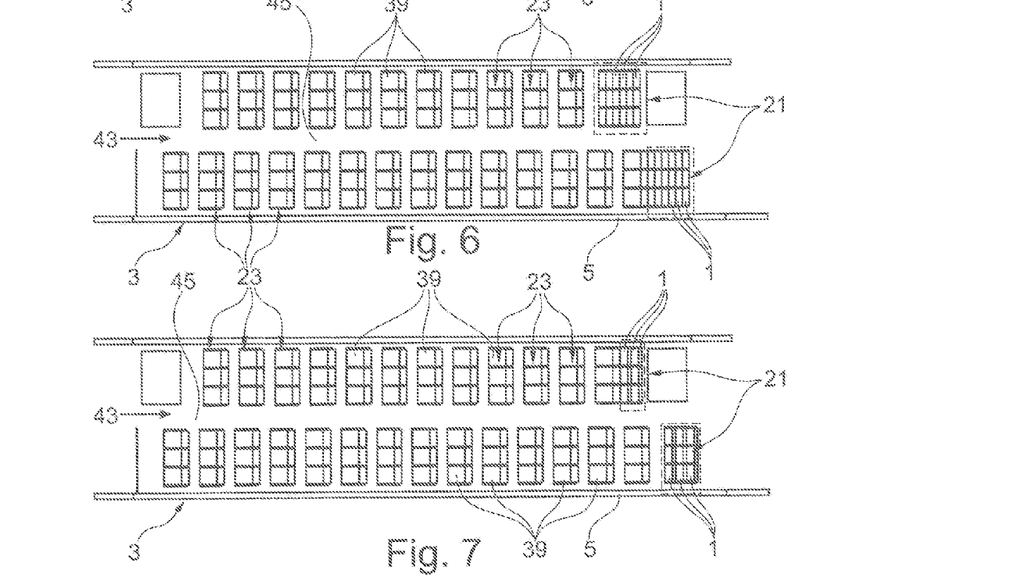
FIG. 6 shows a cabin of a means of passenger transport in which some of the seats are unused and have been transformed into the stored state as in FIG. 2.
FIG. 7 shows a cabin of a means of passenger transport in which some of the seats are unused and have been transformed into the stored state as in FIG. 3.

By contrast, the seating configurations shown in FIGS. 6 and 7 are only possible by using folding passenger seats 1. FIG. 6 shows a cabin 43 of the means of passenger transport 5 in which likewise only some of the seats are used. In this context, the unused folding passenger seats 1 in the rear region of the cabin 43 are transformed into the stored state 21 as shown in the embodiment of FIG. 2. In this context, the rear seat leg 11 of the respective folding passenger seat 1 is rotated by means of a first joint element 17. In this way, the folding passenger seats 1 take up a smaller space than in the embodiment of FIG. 5. As a result, more seats and/or increased spacing of the seats of for example about 36" or about 37" can be provided. In this context, by contrast with the embodiment of FIG. 5, in which only 69 seats can be arranged with a spacing of about 36", 75 seats can be arranged with a spacing of about 36" in the embodiment of FIG. 6.

In FIG. 7, the folding passenger seats 1 of a cabin 43 which is not fully occupied are transformed into a stored state 21 as in FIG. 3. By rotating the rear seat leg 11 about the first joint element 17 and additionally releasing the rear seat leg 11 from the rails 41, the space required by the folding passenger seat 1 in the stored state 21 can additionally be reduced, in such a way that additional passenger seats can be provided at a seat spacing 25 of about 36" or about 37" by comparison with the embodiment of FIG. 6. In total, 78 seats can be provided with a seat spacing 25 of about 36" or about 37" in the embodiment of FIG. 7.

In this context, it is clear from FIGS. 6 and 7 that the folding passenger seats 1 can be combined with conventional seats 39. For example, the folding passenger seats 1 can be arranged in a rear region of the cabin 43 and the conventional seats 39 can be arranged in a front region of the cabin.

Figure 8:
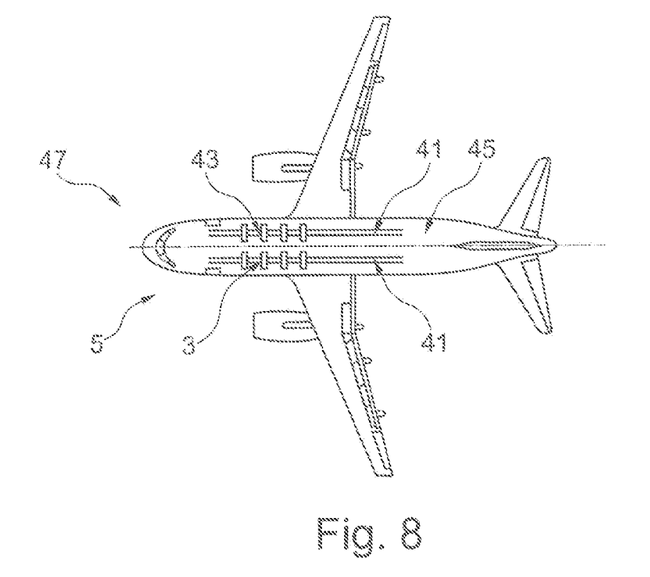
FIG. 8 shows an aircraft having a passenger seating system in accordance with an embodiment of the present disclosure.

FIG. 8 shows the configuration of the means of passenger transport 5 as an aircraft 47. In this context, the folding passenger seats 1 may be combined to form rows of seats and arranged as a passenger seating system 3 on rails 41 in the cabin 43.

Figure 9:
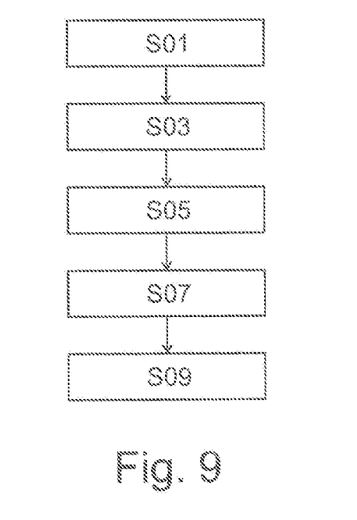
FIG. 9 shows a method for manufacturing a folding passenger seat in accordance with an embodiment of the present disclosure.

FIG. 9 shows a method for manufacturing a folding passenger seat 1. In S01, a seat frame 7 is provided. In S03, a front seat leg 9 having a first fastening element 13 is arranged on the seat frame 7. In S05, a rear seat leg 11 having a second fastening element 15 is arranged on the seat frame 7. Further, in S07, the first fastening element 13 and the second fastening element 15 are configured such that they can be connected to rails 41 on the cabin floor of the means of passenger transport 5 and can be displaceable in the rails 41. In S09, a first joint element 17 is further arranged between the front seat leg and the seat frame 7 and/or between the rear seat leg 11 and the seat frame 7 such that a spacing between the first fastening element 13 and the second fastening element 15 is variable.

The following method can be used to transform the folding passenger seat 1 from the usable state 23 into the stored state 21: releasing a rail cover 51 from the rear fitting or from the second fastening element 15 (the rail cover 51 is shown for example in FIGS. 1 and 2); releasing the rear fitting from the rails 41; lifting the folding passenger seat 1 or the seat frame 7 and rotating the folding passenger seat 1 about the first fastening element 13; optionally positioning the rear fitting on the front fitting; rotating the folding passenger seat 1 or the backrest 27 about the second joint element 29 such that the backrest 27 is arranged in a substantially vertical position; rotating the armrest 35 about a fourth joint element 37 such that the armrest 35 is likewise arranged in a substantially vertical position, it thus being possible to rotate the armrest for example upwards or downwards about the fourth joint element 37; rotating the seat cushion 31 about the third joint element 33 such that it is likewise positioned in a substantially vertical position; lifting the rail cover 51 and fixing the rail cover 51 for example to the rear seat leg 11.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A folding passenger seat for a means of passenger transport, the passenger seat comprising:
    a seat frame;
    a front seat leg having a first fastening element;
    a rear seat leg having a second fastening element; and
    a first joint element arranged between the seat frame and one of the front seat leg and the rear seat leg
    such that a spacing between the first fastening element and the second fastening element is variable,
    where the first fastening element and the second fastening element are configured to be connected to one or more rails on the means of passenger transport and to be moved in the rails, and
    wherein the front seat leg and the rear seat leg are connectable to the one or more rails in a pivotable manner in relation to the one or more rails.

2. The folding passenger seat according to claim 1,
    wherein the folding passenger seat is movable between a stored state and a usable state;
    wherein the spacing between the first fastening element and the second fastening element is smaller in the stored state than in the usable state.

3. The folding passenger seat according to claim 2, further comprising:
    a backrest;
    wherein the backrest is connected to the seat frame via a second joint element such that the backrest is positioned above at least one of the first fastening element and the second fastening element in the stored state.

4. The folding passenger seat according to claim 3, further comprising:
    an armrest;
    wherein the armrest is connected to the backrest via a third joint element such that the armrest is positioned above at least one of the first fastening element and the second fastening element in the stored state.

5. The folding passenger seat according to claim 2,
    wherein the folding passenger seat has a seat spacing in the stored state of a maximum of 16 inches from at least one of an adjacent front seat and an adjacent rear seat.

6. The folding passenger seat according to claim 2, further comprising:
    a seat cushion;

wherein the seat cushion is connected to the seat frame via a second joint element such that the seat cushion is positioned above at least one of the first fastening element and the second fastening element in the stored state.

7. The folding passenger seat according to claim 2, wherein the folding passenger seat has a seat spacing in the stored state of a maximum of 11 inches from at least one of an adjacent front seat and an adjacent rear seat.

8. The folding passenger seat according to claim 1, further comprising:
   a seat cushion;
   wherein the seat cushion is removably fastened to the seat frame.

* * * * *